United States Patent
Sanz Gamboa

(10) Patent No.: US 8,939,264 B2
(45) Date of Patent: Jan. 27, 2015

(54) CONNECTION SYSTEM, WITH SELF-ALIGNMENT, FOR ELEVATOR GUIDES

(75) Inventor: Jesus Sanz Gamboa, Vera de Bidasoa (ES)

(73) Assignee: S.A. de Vera (Savera), Vera de Bidasoa (Navarra) (ES)

( * ) Notice: Subject to any disclaimer, the term of this patent is extended or adjusted under 35 U.S.C. 154(b) by 697 days.

(21) Appl. No.: 13/148,729

(22) PCT Filed: Apr. 2, 2009

(86) PCT No.: PCT/ES2009/000181
§ 371 (c)(1),
(2), (4) Date: Aug. 10, 2011

(87) PCT Pub. No.: WO2010/112620
PCT Pub. Date: Oct. 7, 2010

(65) Prior Publication Data
US 2011/0309156 A1    Dec. 22, 2011

(51) Int. Cl.
*B66B 7/02* (2006.01)
*F16B 1/00* (2006.01)
*B66B 19/00* (2006.01)
*B66C 7/08* (2006.01)

(52) U.S. Cl.
CPC . *B66B 7/026* (2013.01); *F16B 1/00* (2013.01); *B66C 7/08* (2013.01)
USPC ............. 187/408; 187/406; 403/286; 52/849; 104/127

(58) Field of Classification Search
CPC ............ B66B 7/026; B61B 5/02; B66C 7/08; E04H 12/00
USPC .......... 187/406, 408, 409, 414, 900; 104/124–127; 29/428, 429, 464, 467; 403/286; 52/849

See application file for complete search history.

(56) References Cited

U.S. PATENT DOCUMENTS

| | | | | |
|---|---|---|---|---|
| 1,720,202 | A * | 7/1929 | Benjamin | 187/406 |
| 3,252,495 | A | 5/1966 | Waltermire et al. | |
| 3,640,328 | A * | 2/1972 | Tummarello | 411/103 |
| 6,413,005 | B1 * | 7/2002 | Massie | 403/334 |
| 6,830,133 | B2 * | 12/2004 | Sneed | 187/408 |
| 6,991,070 | B1 * | 1/2006 | Sanz Gamboa | 187/408 |
| 8,696,230 | B2 * | 4/2014 | Sanz Gamboa | 403/286 |

(Continued)

FOREIGN PATENT DOCUMENTS

| | | | |
|---|---|---|---|
| EP | 506216 A1 * | 9/1992 | B66B 7/02 |
| EP | 1498381 A1 | 1/2005 | |

(Continued)

OTHER PUBLICATIONS

EPO, Machine Translation, Description ES2255351, pp. 1-6.*

*Primary Examiner* — Michael Mansen
*Assistant Examiner* — Stefan Kruer
(74) *Attorney, Agent, or Firm* — Lucas & Mercanti, LLP

(57) ABSTRACT

Connection system, with self-alignment, for elevator guides, in which the front surfaces thereof maintain a perfect 90° angle with respect to the longitudinal axis (e) of each guide (1) and there is a connection plate (2) that forms through-holes (241) that are offset and in correspondence with holes (141) in the wings (14), such that, when connection means (3) are mounted therein, a front self-alignment pressure is created between the two guides (1).

5 Claims, 15 Drawing Sheets

(56) References Cited

U.S. PATENT DOCUMENTS

| | | | |
|---|---|---|---|
| 2004/0195049 A1* | 10/2004 | Stobo et al. | 187/401 |
| 2004/0261647 A1* | 12/2004 | Reichel et al. | 104/124 |
| 2007/0172311 A1* | 7/2007 | Sanz Gamboa | 403/252 |

FOREIGN PATENT DOCUMENTS

| | | | | |
|---|---|---|---|---|
| EP | 1743863 A1 | 1/2007 | | |
| ES | 2047651 T3 | 3/1994 | | |
| ES | 2255351 A1 | 6/2006 | | |
| ES | 2320949 A1 | 5/2009 | | |
| GB | 2150960 A * | 7/1985 | | B66B 7/02 |
| JP | 2513802 B2 * | 7/1996 | | B66B 7/02 |
| JP | 09086825 A * | 3/1997 | | B66B 7/02 |
| JP | 9086825 A | 3/1997 | | |
| WO | 03048456 A1 | 6/2003 | | |
| WO | WO 2005070805 A1 * | 8/2005 | | B66B 7/02 |

* cited by examiner

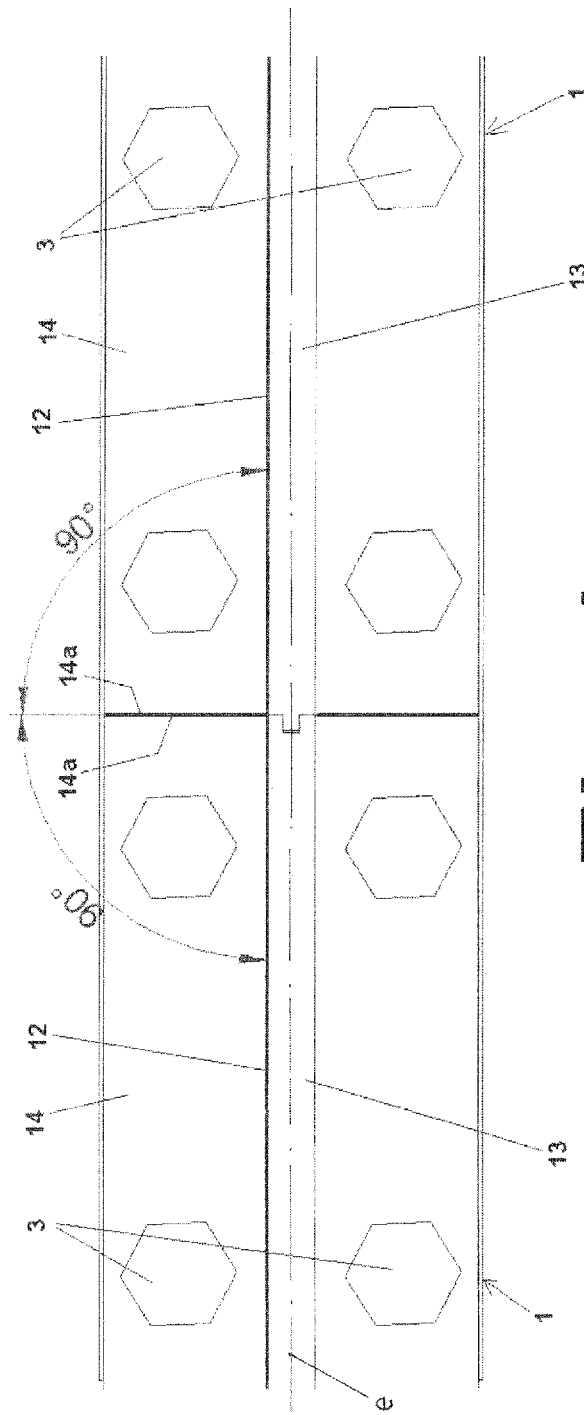

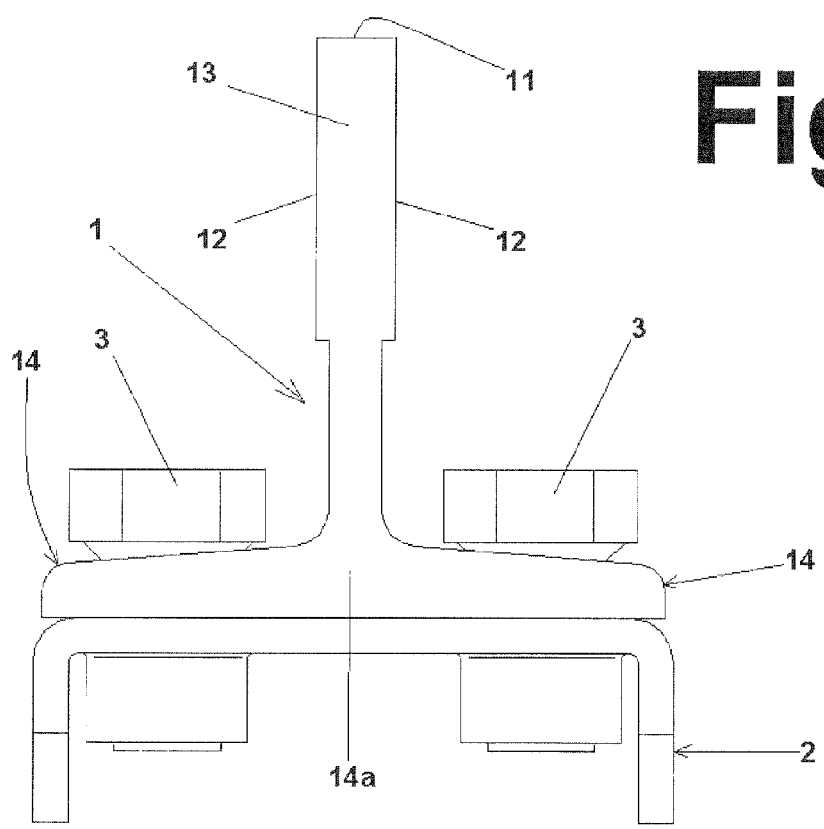

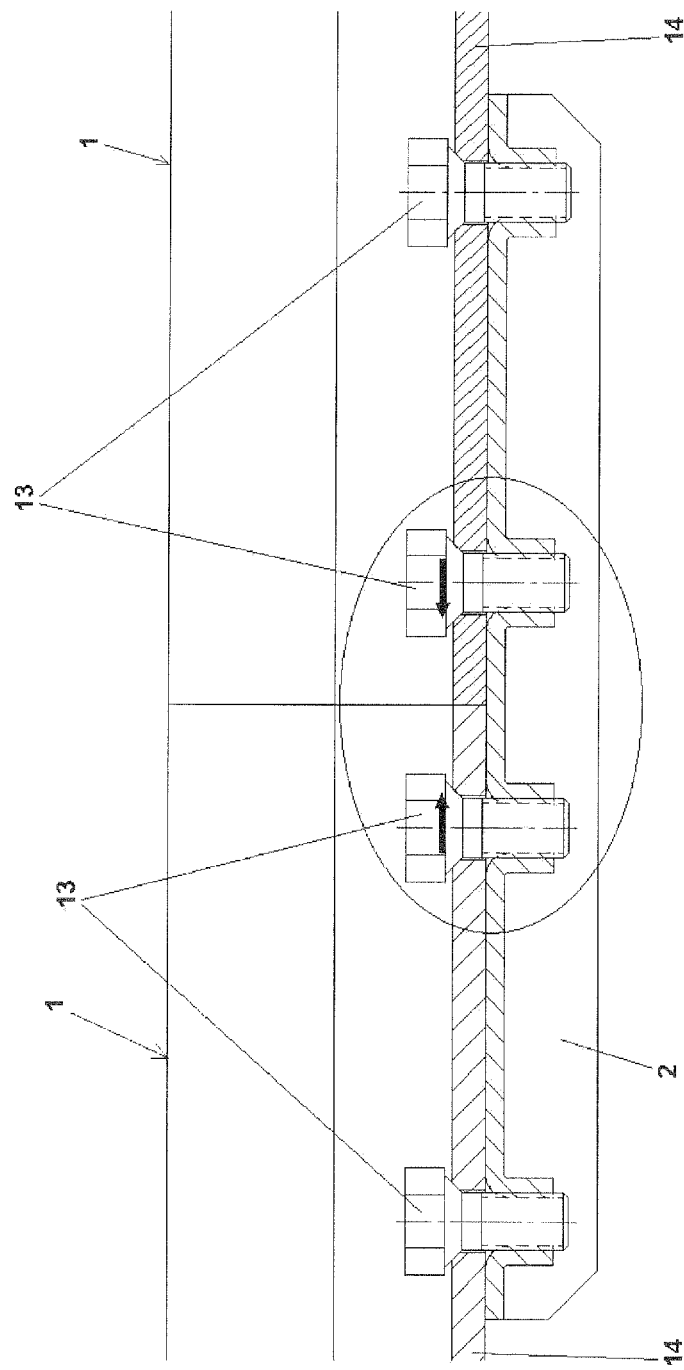

ial form of practical embodiment is shown in the drawings,
CONNECTION SYSTEM, WITH SELF-ALIGNMENT, FOR ELEVATOR GUIDES This application is a 371 of PCT/ES2009/000181 filed Apr. 2, 2009, which is incorporated by reference herein.

This invention involves a connection system with self-alignment for elevator guides.

In the current State of the Art, diverse systems for aligned connection of elevator guides are already known; these consist of guides with a stem and side wings and plates for connection between said guides. The applicant developed systems of this type and is owner of, among others, the Patent WO 01/47796 and WO 2005/070805, which create a front pressure of alignment between the guides and their connection plates.

The connection system, with self-alignment, for elevator guides that is the object of the invention is a great improvement with respect to is known systems of assembly in that it creates frontal pressure of alignment between the guides to be connected.

The problem found with the known connected and self-aligned guides is that under side forces (F) in the guide connection zones, the guides act like a beam undergoing compression tensions on the side of application of the forces (F) and of traction on the side opposite to that of application of said forces (F); thus, the guides tend to separate on said opposite side and to become out of alignment with each other.

The second problem involved in the self-alignment of the known guides is that they required precision machining on the side faces of the guide and of the connection plate, that is, at least two separate precision machining operations.

Both problems have been solved with the object of this patent as follows:

a) the front surfaces form a precision finish, forming a perfect 90° angle between said front surfaces with respect to the longitudinal axis of each guide;

b) the wings corresponding to two guides to be connected coincide fully with each other, making perfect contact in the entire front surface of their contact zones;

c) each wing forms through-holes;

d) there is a connection plate that forms through-holes in correspondence with the holes of the wings;

e) there are means of retention lodged in said holes of the plate guides;

the holes being opposite each other in pairs and separated from each other a certain distance ($\Delta$) in the direction of the longitudinal guide axis, so that, on mounting the means on them, a front pressure of alignment is created between both guides.

It is observed that the gap ($\Delta$) between the holes of the wings of the guide and the conjugated holes of the connection plate cause stresses of connection in the direction of the longitudinal axis of the guide that compensate the traction tensions that can be caused by the side stresses on the guides.

It is also observed that with the new system it is only necessary to perform precision machining on the front surface of the guide, instead of the two precision machining operations in the known systems.

The improvements provided by the connection system that is the object of the invention with respect to that which is known (precision finish of the front surface of the wings of each guide and gap between holes of guides and connection plate to create a front pressure of alignment in assembly) result in self-alignment of the guides that reduce the assembly time.

Moreover:

The alignment is automatic on both axes.

The alignment on the OY axis is based on:

The precision of the positioning of the holes of the connection plate and of the holes of the guides.

On the front pressure exerted by the screws to connect the two guides.

On the precision of the machining square of the ends in relation to the carriage bolt of the guide.

The rigidity in the OY axis is much greater than the conventional guide because it does now allow sliding between the plate and the guide.

Although the guides are subject to traction, they do not separate, which is the opposite of what occurs in previous guide connection systems.

To better understand the object of this invention, a preferential form of practical embodiment is shown in the drawings, subject to additional changes which do not alter its basis.

FIG. 1 is a general plan view of the connection system with self-alignment for elevator guides, which is the object of the invention.

FIG. 2 is a front view corresponding to the previous figure.

FIG. 3*a* is a longitudinal section, in detail, for an example of embodiment.

Figure 3B:
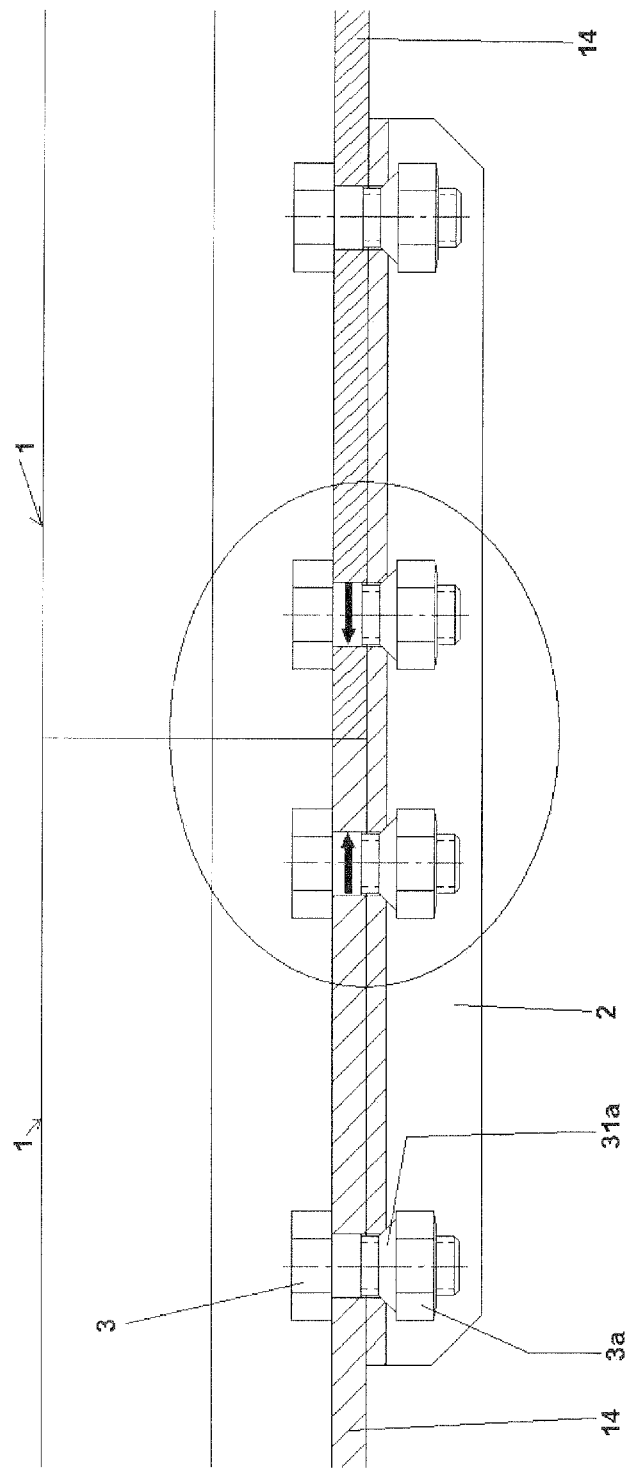

FIG. 3*b* is a longitudinal section, in detail, for an example of alternative embodiment.

Figure 4A:
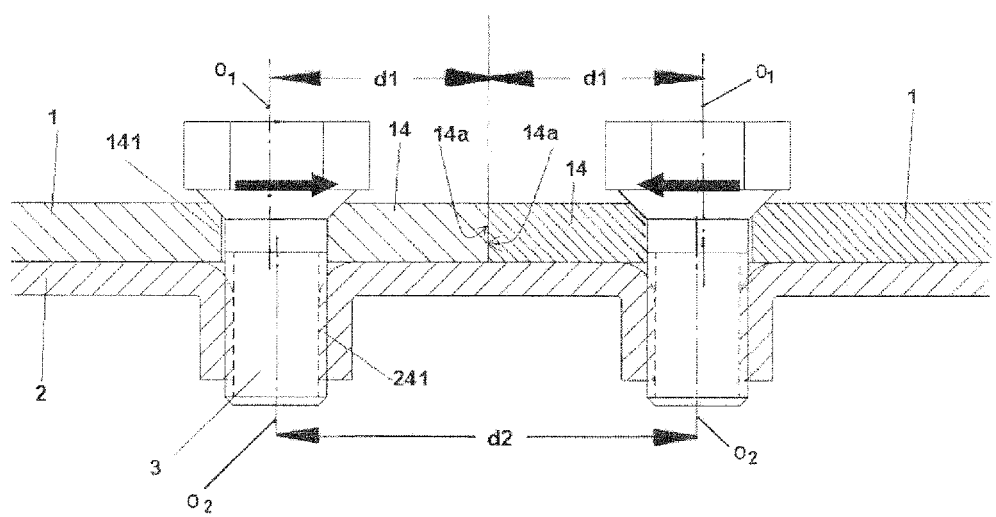

FIG. 4*a* is an enlarged breakdown of the connection zone, according to indication of FIG. 3*a*.

Figure 4B:
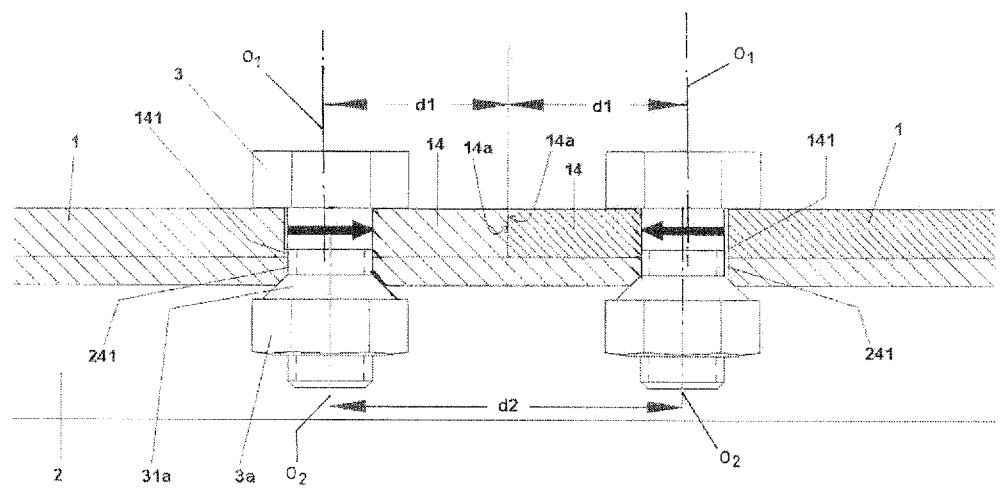

FIG. 4*b* is an enlarged breakdown of the connection zone, according to indication of FIG. 3*b*.

Figure 4C:
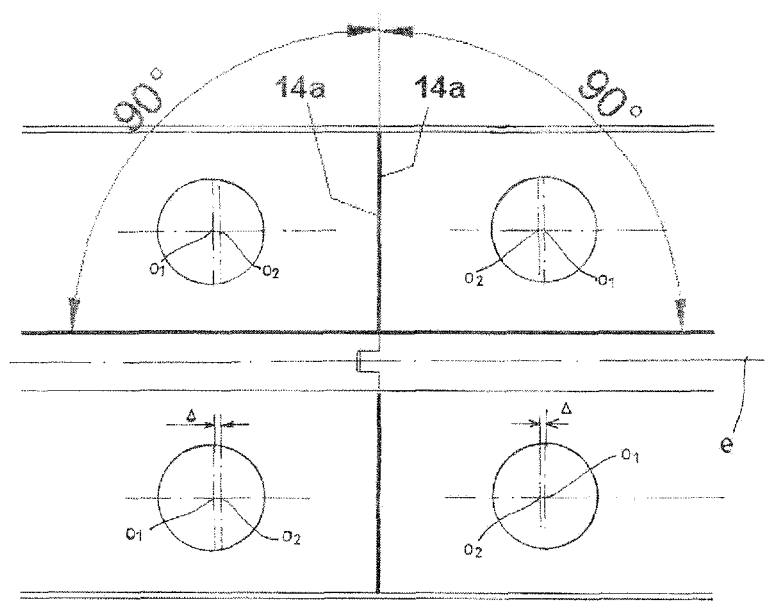

FIG. 4*c* is a plan view corresponding to FIG. 4*a*, without screw (3).

FIGS. 5*a*, 5*b*, 5*c*, 5*d*, are examples of embodiment of the connection plate (2), for the embodiment of FIGS. 3*a*, 4*a*.

FIGS. 6*a*, 6*b*, 6*c*, 6*d*, are examples of embodiment of the connection plate (2), for the embodiment of FIGS. 3*b*, 4*b*.

The following describes an example of practical, non-limiting embodiment of this invention.

The connection system with self-alignment for elevator guides which is the object of the invention is used in guides (1) of the type comprising a stem (13) and a wing (14) at each side.

The front surfaces (14*a*) of the wings (14) form, in origin, a precision finish, keeping a perfect 90° angle with respect to the side surfaces (12) of the stem (13); thus, in the assembly, the wings (14) corresponding to two guides (1) to be connected coincide fully with each other, making contact in the entire front surface (14*a*) of their contact zones.

Each wing (14) constitutes, in origin, holes (141), with axis, ($0_1$) said holes being (141) placed opposite each other in pairs: one or several pairs spaced between each other a predetermined distance, for example, the last of whose pairs is machined at a distance ($d_1$) from the end of the guide (1)—FIG. 4*a*—.

There is a connection plate (2) that forms, in origin, holes (241), with axis ($0_2$) placed opposite each other in pairs and conjugated with the holes (141) of the wings (14) and with at least two pairs of said holes (241) spaced between each other a distance ($d_2$).

There are means of retention (3) lodged in the holes (141) of the guides (1) and in the holes (241) of the connection plate (2) so that they related permanently and jointly to each other said connection plate (2) to the wings (14) of two guides (1) to be joined.

The holes (141), (241) opposite each other in pairs, are separated from each other, that is, that their axes ($0_1$), ($0_2$) are separated longitudinally from the guides, which in FIG. 4*a* is observed to be a distance $2\Delta=2d_1-d_2$; so that, when the screws (3) are mounted in them, a front pressure of alignment is created between both guides (1).

Figure 5A:
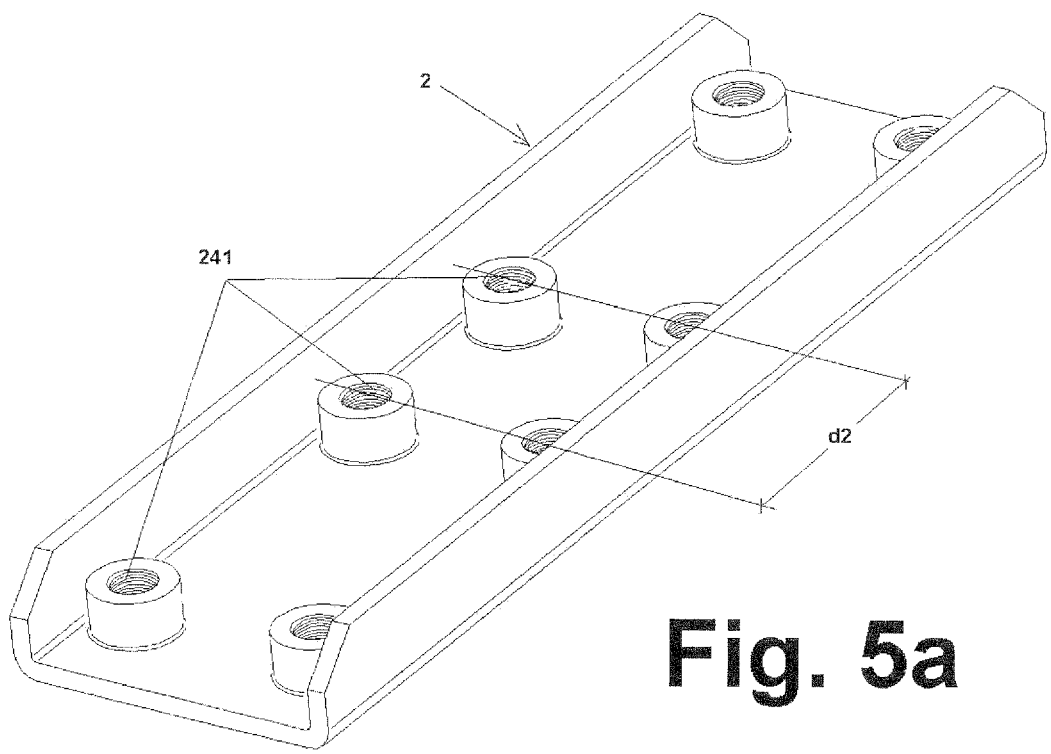
Figure 5B:
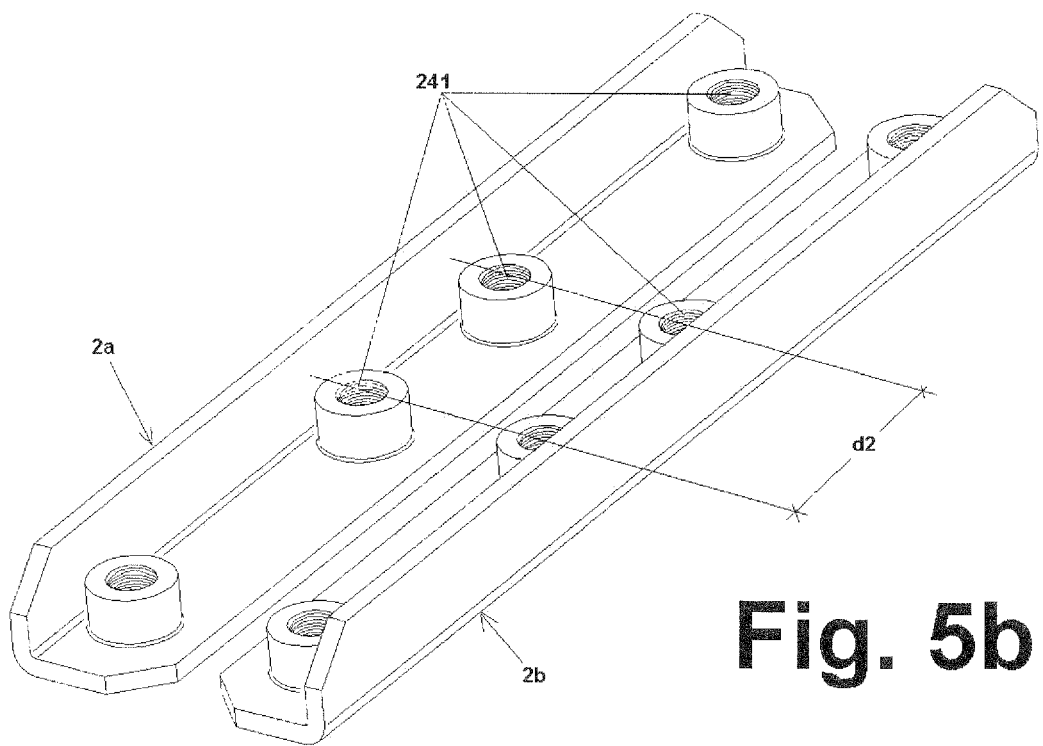
Figure 5C:
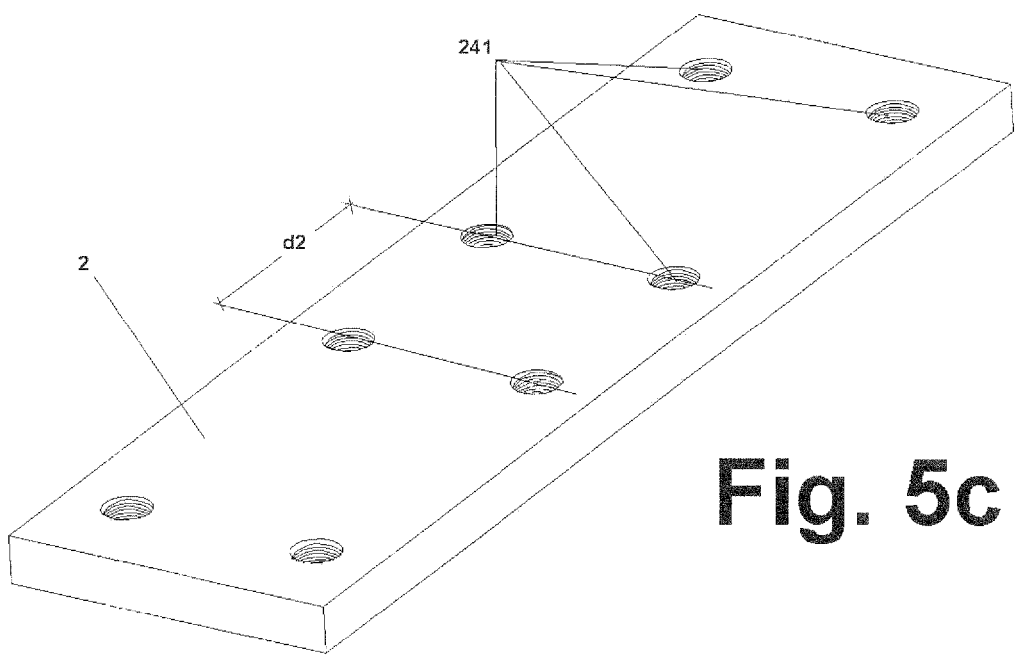
Figure 6A:
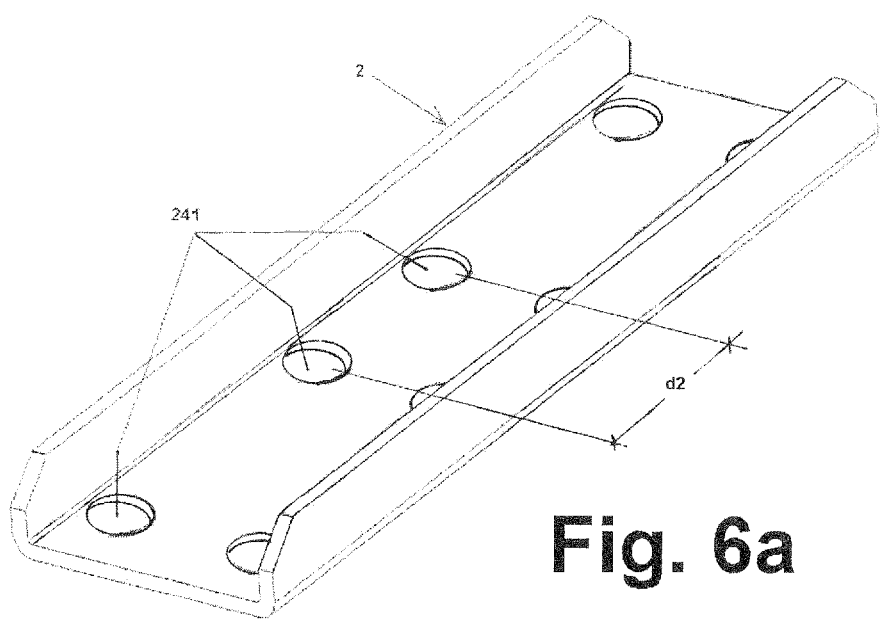
Figure 6B:
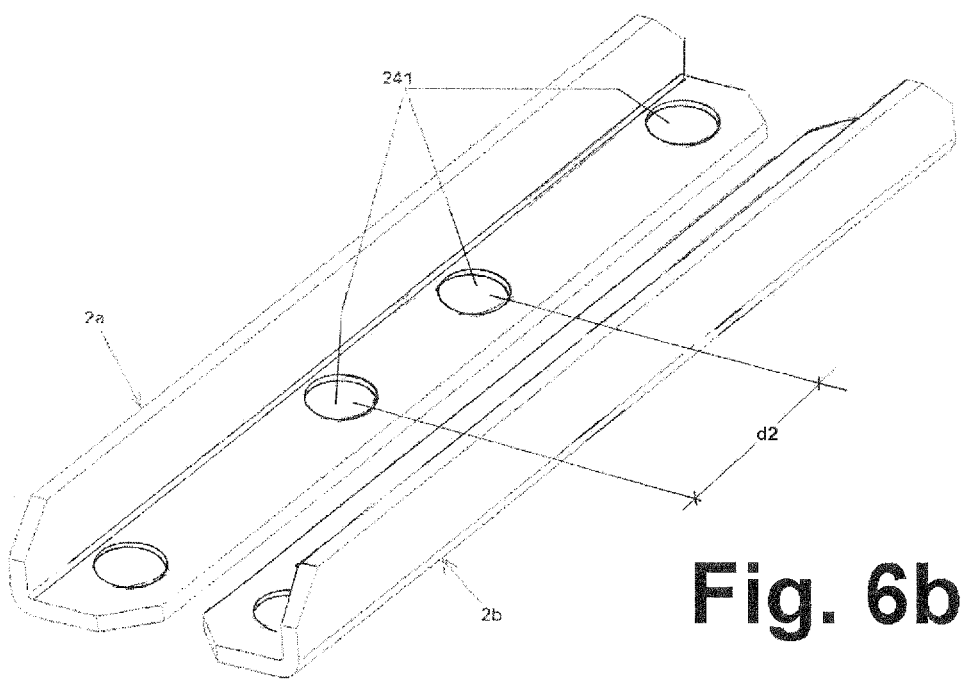

Based on this fundamental concept, any embodiments that do not alter, change or modify the essential proposal are included in the object of the invention. For example, and in particular:

It is unrelated and in addition to the purposes of the invention, that the connection plate (2) is plate or sheet metal and that it is made in a single piece (as in FIG. 5a, 6a or 5c, 6c) or that it is made in two separate pieces (such as in FIGS. 5b, 6b);

It is unrelated and in addition to the purposes of the invention that the connection plate (2) carries threaded holes (241) and the means of connection are screws (3) that pass through the holes (141) of the guides and are screwed in the holes (241) of the connection plate (2)—such as in FIGS. 3a, 4a—, or that the connection plate (2) carries through-holes (241) and the means of connection are screws (3) that pass through both holes (141), (241) aligned with said gap $\Delta$ between them, threading the screws (3) on a self-centering nut (3a)—as in FIGS. 3b, 4b—.

In the embodiment of the FIGS. 3a, 4a, the connection plates (2) have threaded holes (241) both if they are plate—FIGS. 5a, 5b—and if they are sheet metal—FIG. 5c—.

The connection plates (2) can have the thread in the holes (241) made by stamping in the plate—as in FIGS. 3a and 4a—or by placing of nuts fastened at origin prior to assembly by welding or by any other fastening solution.

Figure 6C:
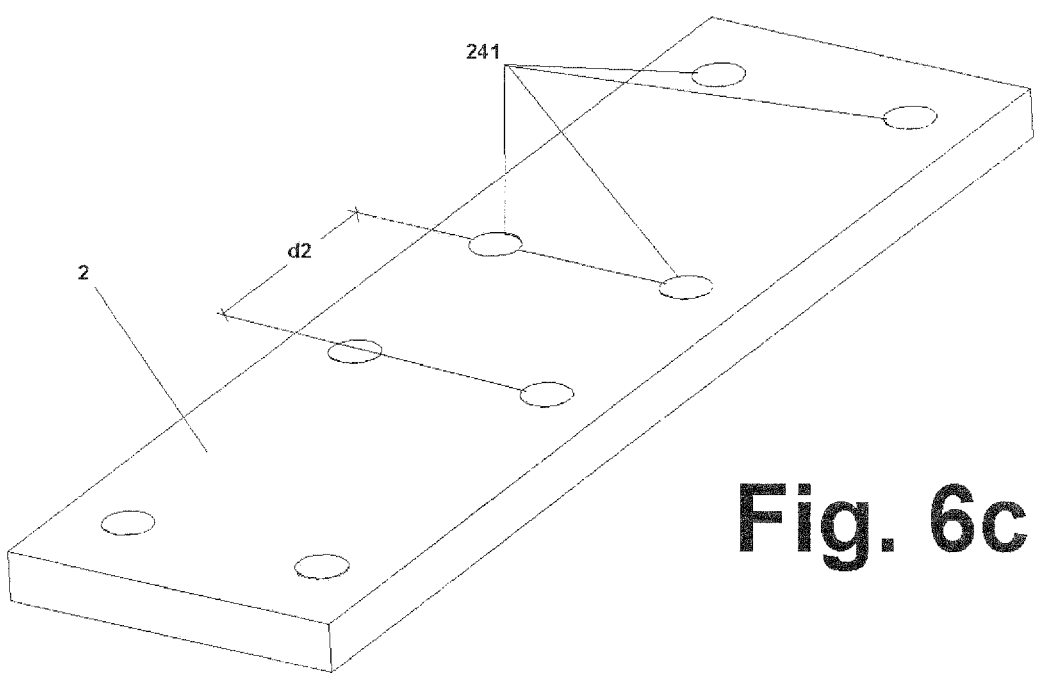

In the embodiment of the FIGS. 3b, 4b, the connection plates (2) have through-holes (241) both if they are plate—FIGS. 6a, 6b—and if they are sheet metal—FIG. 6c—.

The self-centering nuts (3a) form or define a head in ramp (31a), which is the one that is supported against the connection plate (2), being self-centered in its through-hole (241).

In either of the two embodiments, the system of connection with self-alignment for elevator guides, according to the invention, even the use of pieces of guide (1) has been planned as connection plates (2), using them in inverted position.

Figure 5D:
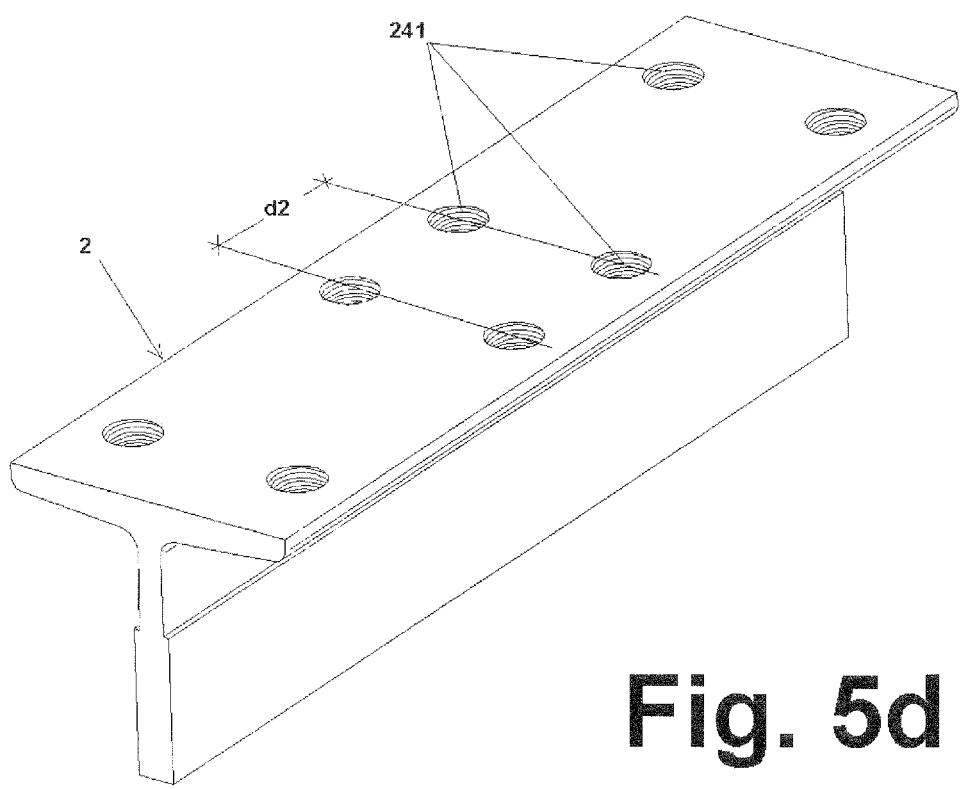

In the embodiment of FIG. 5d it is only necessary to form threads in the holes (141) of the pieces of guide (1) in order for said holes to behave as holes (241) and the guide (1) in inverted position to behave as a connection plate (2).

Figure 6D:
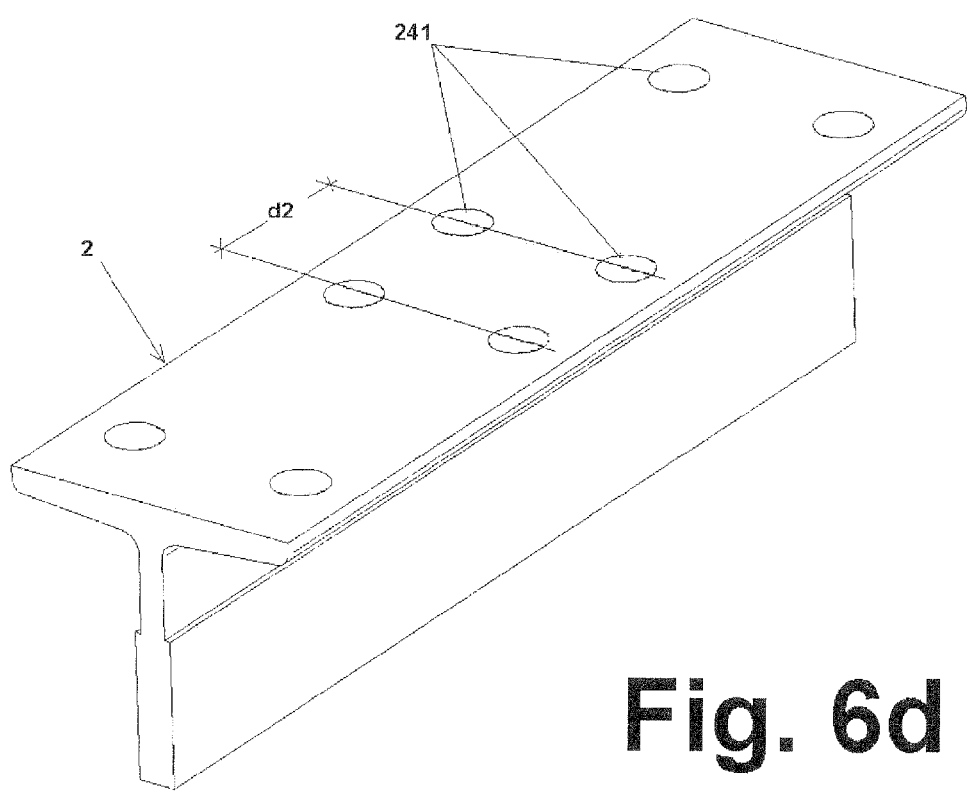

In the embodiment of FIG. 6d it is not even necessary to make the thread, and pieces of guide (1) can be used directly in inverted position.

The invention claimed is:

1. A connection system for elevator guides along which an elevator car travels, wherein the system includes two elevator guides to be connected end to end, the guides having confrontingly opposed front surfaces, and each of the guides having a stem, by which the elevator car is guided, side wings and a longitudinal axis, wherein said stem extends from, and is bordered by, the side wings;

the front surfaces are machined to a finish whereby said front surfaces form a 90° angle with the longitudinal axis of the each of the guides, said finish further enabling the wings of the two guides to be connected and coincide fully with each other when the wings of the two guides contact each other over an entire area of the front surfaces such that the longitudinal axes of the two guides are aligned;

wherein, further, each wing forms through-holes;

a connection plate forms through-holes for correspondence with the holes of the wings; and means of retention for lodging in said holes of the guides and of the plate;

wherein the holes of the wings and the holes of the connection plate face each other in pairs when the wings and the plate are mated for shared acceptance of said means of retention, and axes of at least some of the pairs are separated from each other by a distance in a direction of the longitudinal axis of the guides so that by mounting the means of retention in the at least some of the pairs, the confrontingly opposed front surfaces are pressed against each other in the direction of the longitudinal axis, whereby a pressure of alignment is created between the two guides solely along said opposing front surfaces.

2. The connection system according to claim 1, wherein:

the connection plate forms through-holes in correspondence with the holes of the wings;

retention screws are lodged in said holes and each is threaded in a self-centering nut.

3. The connection system according to claim 2, wherein:

the holes of each wing form a pair with a corresponding hole of the other of each wing, wherein each hole nearest an end of a respective guide, thereby the front surfaces of the respective guide, is machined at a distance $(d_1)$ from the end of the guide;

the threaded holes of the connection plate form cooperative pairs, wherein each of the holes of the cooperative pairs are spaced from each other a distance $(d_2)$ parallel to the longitudinal axis of the guide;

centerlines of the paired holes of the wings and centerlines of the paired holes of the connection plate result in an offset $2\Delta=2d_1-d_2$; so that, when the screws are installed in the paired holes of the wings and the connection plate, and fastened with self-centering nuts, the pressure of alignment between both the two guides is created.

4. The connection system according to claim 1, wherein:

the connection plate forms through-holes in correspondence with the holes of the wings; and retention screws are lodged in said holes of the guides and threaded in the holes of the plate.

5. The connection system according to claim 4, wherein:

the holes of each wing form a pair with a corresponding hole of the other of each wing, wherein each hole nearest an end of a respective guide, is machined at a distance $(d_1)$ from one of the front surfaces of the guide;

the threaded holes of the connection plate form cooperative pairs, wherein each of the holes of the cooperative pairs are spaced from each other a distance $(d_2)$ parallel to the longitudinal axis of the guide;

centerlines of the paired holes of the wings and centerlines of the paired holes of the connection plate result in an offset $2\Delta=2d_1-d_2$; so that, when the screws are mounted in the paired holes of the wings and the connection plate, the pressure of alignment between both the two guides is created.

\* \* \* \* \*